(12) United States Patent
Willars et al.

(10) Patent No.: US 8,296,443 B2
(45) Date of Patent: Oct. 23, 2012

(54) METHOD OF DISCOVERING OPERATOR-PROVIDED NETWORK-SERVICES USING IMS

(75) Inventors: Per Willars, Vaxholm (SE); Niklas Björk, Uppsala (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 227 days.

(21) Appl. No.: 12/668,321

(22) PCT Filed: Jul. 10, 2007

(86) PCT No.: PCT/SE2007/000679
§ 371 (c)(1),
(2), (4) Date: Apr. 13, 2010

(87) PCT Pub. No.: WO2009/008782
PCT Pub. Date: Jan. 15, 2009

(65) Prior Publication Data
US 2010/0198975 A1    Aug. 5, 2010

(51) Int. Cl.
*G06F 15/16* (2006.01)
(52) U.S. Cl. ........ 709/227; 709/238; 370/351; 370/352; 370/354
(58) Field of Classification Search .................. 709/227; 370/351–354
See application file for complete search history.

(56) References Cited

U.S. PATENT DOCUMENTS

| | | | |
|---|---|---|---|
| 6,856,616 B1 * | 2/2005 | Schuster et al. | 370/352 |
| 7,313,617 B2 * | 12/2007 | Malik et al. | 709/225 |
| 7,672,255 B2 * | 3/2010 | Lin | 370/260 |
| 2003/0147404 A1 * | 8/2003 | Mazo | 370/400 |
| 2003/0149774 A1 * | 8/2003 | McConnell et al. | 709/227 |
| 2003/0214943 A1 * | 11/2003 | Engstrom et al. | 370/353 |
| 2004/0024879 A1 * | 2/2004 | Dingman et al. | 709/227 |
| 2004/0088419 A1 * | 5/2004 | Westman | 709/227 |
| 2005/0031108 A1 * | 2/2005 | Eshun et al. | 379/201.12 |
| 2006/0126601 A1 * | 6/2006 | Kim et al. | 370/352 |

(Continued)

FOREIGN PATENT DOCUMENTS

EP    1432212 A1    6/2004

(Continued)

*Primary Examiner* — Wing Chan
*Assistant Examiner* — Razu Miah
(74) *Attorney, Agent, or Firm* — Coats & Bennett, P.L.L.C.

(57) ABSTRACT

A method, a session managing node and an arrangement for providing a network-service address of at least one network-service of an IMS network (401) of a first operator to a third party service provider (403), wherein the third party service provider has no business agreement with the first operator. A first application (404) of a mobile station is communicating with a second application (405) via a first network (406), resulting in the set-up of an IMS-session, between the mobile station and the third party service provider. A network-service address of at least one network-service, provided by the IMS network of the first operator, is inserted into a SIP message of the IMS-session in a session managing node (600) of the IMS network of the first operator and delivered to the third party service provider, where it is forwarded to the second application. If required, the second application may access the one or more network-services via the first network, using the retrieved network-address.

19 Claims, 5 Drawing Sheets

U.S. PATENT DOCUMENTS

| | | |
|---|---|---|
| 2006/0129676 A1* | 6/2006 | Modi et al. .................... 709/227 |
| 2006/0230154 A1* | 10/2006 | Nguyenphu et al. .......... 709/227 |
| 2006/0248206 A1* | 11/2006 | Moerdijk et al. ............. 709/230 |
| 2007/0005712 A1* | 1/2007 | Tiainen ......................... 709/206 |
| 2007/0127647 A1 | 6/2007 | Russell |
| 2007/0189218 A1* | 8/2007 | Oba et al. ..................... 370/331 |

FOREIGN PATENT DOCUMENTS

| | | |
|---|---|---|
| EP | 1748670 A1 | 1/2007 |
| GB | 2376845 A | 12/2002 |
| WO | 2007/002421 A1 | 1/2007 |

* cited by examiner

METHOD OF DISCOVERING OPERATOR-PROVIDED NETWORK-SERVICES USING IMS

TECHNICAL FIELD

The present invention relates generally to a method and arrangement for providing a third party service provider access to network-services offered by an IMS network of an operator with which the third party service provider has no prior business relation.

BACKGROUND

IMS (IP Multimedia Subsystem) is a set of standards providing the signalling, delivery, authentication and billing functions necessary for real-time, packet-based calls and services across virtually any underlying network technology. In other words, IMS is a platform adapted for an efficient and rapid implementation of next-generation IP services in both fixed and mobile networks which will accelerate the convergence of fixed and wireless networks.

A common description of a driving vision behind IMS is the focus on giving subscribers consistent, converged services in daily life communication, involving the concept of "one handset device, one address book, one email address, and one bill" from all service sessions across all networks, comprising traditional telephony, as well as Internet communication over all wire-line and wireless transports.

Normally, IMS subscribers have a plurality of IMS operators to choose from, each having different services and prices to offer. Typically an IMS subscriber has a business agreement with one of the IMS operators operating on the market. From the IMS subscribers point of view, however, it is desirable to have access to a wider range of service than what can be offered by one chosen IMS operator. In order to be able to satisfy its subscribers, IMS operators often have mutual business agreements with each other, whereby one IMS operator can offer or make use of another IMS operators services.

FIG. 1 illustrates one way of delivering services from a third party service provider 103 to a user of a mobile station 100 over IMS, according to the prior art. The user of mobile station 100 is a subscriber of a first IMS operator managing an. IMS network 101. The first IMS operator, however, do not have any direct business relation with the third party service provider 103, and, thus, it is not obvious that the mobile station 100 can access services from the third party service provider 103 via IMS network 101.

The third party service provider 103 have a business relation with a second operator, managing a second IMS network 102. The user of the mobile station 100, activates an application 104, which recognises a requirement for a service, which can not be accessed from IMS network 101, but which is accessible from the third party service provider 103. A necessary condition for the first operator to be able to offer this service to the user of mobile station 100 is that the first IMS operator has an interconnection agreement with the second IMS operator. In such a situation, the mobile station 100 may set-up an IMS session with the third party service provider 103, by first connecting with the first operators IMS network 101 in a step 1:1. The first operator of IMS network 101, having an interconnection agreement with the second operator of IMS network 102, sets up an interconnection between the two IMS networks in a second step 1:2, and the second operator completes the IMS-session by connecting to the third party service provider 103 in a third step 1:3. After having completed the signalling (not shown), verifying a successful IMS session set-up from the third party service provider 103, the application 104 of the mobile station 100 may access services, provided from an application 105 of the third party service provider 103, via the IMS session in a final step 1:4.

In another scenario, a third party service provider wanting to enhance its service offering may have a requirement to be able to access certain services from one or more network operators, other than its own operator. In order to do so there has to be a business agreement between the two service providers. Such network-services may include, e.g. user statistics, location information or control of communication quality (QoS), and may be provided via standardised or published interfaces, such as e.g. parlay or different types of web services.

A prior art scenario illustrating this type of situation will now be described with reference to FIG. 2, wherein a third party service provider 203, providing services to a user of a mobile station 200, via a first network 206 wants to enhance its services by using an additional network-service provided from an IMS network 201 of a first operator. A user of mobile station 200, has initiated an application 204, which requires a service, accessible from the third party service provider 203. Initially, the application 204 of the mobile station 200 establishes a connection with an application 205 of the third party service provider 103 in a first step 2:1, via the first network 206. In a next step 2:2, the application 105, recognising a requirement for a network-service which can not be provided from the third party service provider, but from the IMS network 201 of the first operator. The application 205, therefore, establishes a connection with IMS network 201, after which the required network-service can be accessed and used by the application 205. In order for the third party service provider to be able to access the required service from the IMS network 201 of the first operator, however, the third service provider 203 has to have a business relation with the first operator.

As mentioned in both prior art scenarios presented above, it is necessary to have established a business relation between two parties if they are to be able to use each others services, and thereby be able to provide an enhanced range of services to its subscribers.

FIG. 3 illustrates how different business agreements can be set up between a first operator, managing a first IMS network 301, a second operator, managing a second IMS network 302, a user of a mobile station 300, and a third party service provider 303, i.e. the participants presented in FIG. 1.

In FIG. 3, the user of mobile station 300 is a subscriber of the operator of IMS network 301, and, thus, a business agreement 304, defined as a subscription, is established between these two parties.

In the figure, the first operator of IMS network 301 also has a business relation 305, defined as an interconnection agreement with the second operator of IMS network 302. As an alternative to a direct interconnection agreement between the first IMS network 301 and the second IMS network 302, a business relation may be set up between the two IMS networks via a transit network (not shown), which may have an interconnection agreement with both IMS networks.

The third party service provider 303, may have another business relation 306 with the second IMS operator to use the second IMS network 302. In addition, the figure illustrates that the user of the mobile station 300 also may have a business relation 307 set-up directly with the third party service provider 303, via a separate network 308.

Failure for parties to get access to network-services offered by certain operators may obstruct an operator from being able to offer competitive services to its subscribers, and may also become an obstacle for the operator in the development of new services. Creation of business relations with all major operators will, however, require great efforts from the operators and third party service providers involved.

SUMMARY

The object of the present invention is to address at least some of the problems outlined above. In particular, it is an object to provide a solution which enables a user connected to a third party service provider to gain access to services, including one or more supplementary services available from an operator that has no prior business relation with the third party service provider.

According to different aspects, a method and an arrangement are defined for providing a network-service address of network-services provided by an IMS network of an operator with which a third party service provider has no business relation. By adapting a session managing node to automatically insert the network-service address of the respective one or more network-services into a SIP message of an IMS-session, set-up between a mobile station and a third part service provider, indirectly requiring the one or more network-services when accessing a service from the third party service provider, network-services will be easily accessible to the third party service provider and to a user of a mobile station without requiring any prior business relation between the third party service provider and the respective operator providing the one or more network-services.

Such an automatic address delivery procedure may be restrictive by using one or more black lists, restricting which parties that are entitled to get access to network-services provided by the respective operator.

According to further aspects, a method of a third party service provider for retrieving a network-service address of at least one network-service, offered by an IMS network (401) of a first IMS operator, wherein the third party service provider has no business agreement with the first IMS operator, is defined. An application of the third party service is activated from a mobile station via a first network. In a next step an IMS-session is established between the third party service provider and the mobile station via the first IMS network. Finally, the network-service address of one or more network-services is retrieved at the application of the third party service provider, wherein the network-service address has been inserted into a mobile originated SIP message of the IMS-session by a session managing node (600) of the first IMS network.

According to one aspect, the first network is the Internet.

According to another aspect, the IMS-session is established via the first IMS network, and a second IMS network of a second operator, with which the third party service provider has a business agreement. The first operator may have a business agreement with the second operator. Alternatively, the two IMS networks may be interconnected via a transit network.

According to yet another aspect, the network-service address is inserted into a new network-services address header of the SIP message.

According to one aspect, one or more network-services are accessed via a network service enabler interface, using the inserted network-service address. The network-service address may be an address to a catalogue of network-services, or to a specific network-service. Alternatively, the network-service address may be an address to a structure, comprising at least one network service enabler address. The catalogue or structure may also comprise an identifier for each network-service, specifying what protocol to use to access a respective network-service.

According to another aspect, also a session identifier may be inserted into the SIP message.

According to one embodiment, the IMS-session is mobile station originated and the network-service address is inserted into a SIP INVITE.

According to another embodiment, the IMS-session is instead mobile station terminated and the network-service address is inserted into a SIP RESPONSE.

According to yet another embodiment, the application of the third party service provider may determine whether the application requires a network-service provided by the IMS network of the first operator, and a required network-service may be accessed from an application server of the IMS network of the first operator via the first network, using the retrieved network-service address.

In another aspect, a method of an IMS network node for providing a network-service address of at least one network-service provided by an IMS network of a first operator to a third party service provider, wherein the third party service provider has no business agreement with the first operator, is provided. According to this aspect, a mobile station originated SIP message of an IMS-session between the third party service provider and a mobile station, accessing a network-service of the third party service provider via a first network, is received. A network-service address is inserted into the SIP message, before the SIP message is transmitted to the third party service provider. Prior to the inserting steps, a step of interrogating a received SIP message for determining whether the terminating and/or the originating part of the IMS-session is registered in a black list (604), may be executed. Depending on the outcome of the interrogation it is determined whether a network-service address is to be inserted into the received SIP-message or not.

According to yet another aspect, a session managing node, is adapted to provide a network-service address of at least one network-service of an IMS network of a first operator to a third party service provider, wherein the third party service provider has no business agreement with the first operator. The session managing node is provided with means for receiving a mobile station originated SIP message of an IMS-session, established between the third party service provider and a mobile station, accessing a network-service of the third party service provider, via a first network. The session managing node further comprises means for inserting a network-service address into the SIP message, upon having interrogated the SIP message, and upon having determined that a network-service address is to be inserted into the SIP message. The SIP message, comprising a network-service address is then transmitted to the third party service provider via a transmitting means.

In yet another aspect, the inserting means may be adapted to determine that no network-service address is to be inserted into a SIP message if the terminating and/or originating part of the IMS-session is found in a black list. Furthermore, the network-service address may be provided from an address database, which is continuously updated by an application server providing network-services. The inserting means may be adapted to insert a session identifier into the SIP message, and the transmitting means may be adapted to transmit the SIP message to the third party service provider via an IMS network (402) of a second operator, wherein the first operator has a business agreement with the second operator.

In another aspect, an arrangement for a telecommunication system comprising a first network, a first IMS network of a first operator, serving a mobile station, and a second IMS network (402) of a second operator, wherein the third party service provider has no business relation with the IMS network of the first operator, is provided. This arrangement comprises means at the third party service provider for establishing a communication between a first application of the mobile station and a second application of the third party, via the first network. The third party service provider further comprises means at the third party service provider for setting up an IMS session between the mobile station and the third party service provider. In addition, the node comprises means for inserting a network-service address of at least one network-service, provided by the IMS network of the first operator, at a session managing node of the IMS network of the first operator, and means for receiving the network-service address at the third party service provider, and for forwarding it to the second application.

According to another aspect, the third party service provider further comprises means for determining whether the second application requires at least one network-service provided from the IMS network of the first operator, and means for setting up a connection with an application server of the IMS network of the first operator via the first network, if the second application requires at least one network-service from the IMS network of the first operator for accessing the at least one network-service, using the retrieved network-service address.

BRIEF DESCRIPTION OF THE DRAWINGS

The present invention will now be described in more detail by means of exemplary embodiments and with reference to the accompanying drawings, in which.

DETAILED DESCRIPTION

Figure 1:
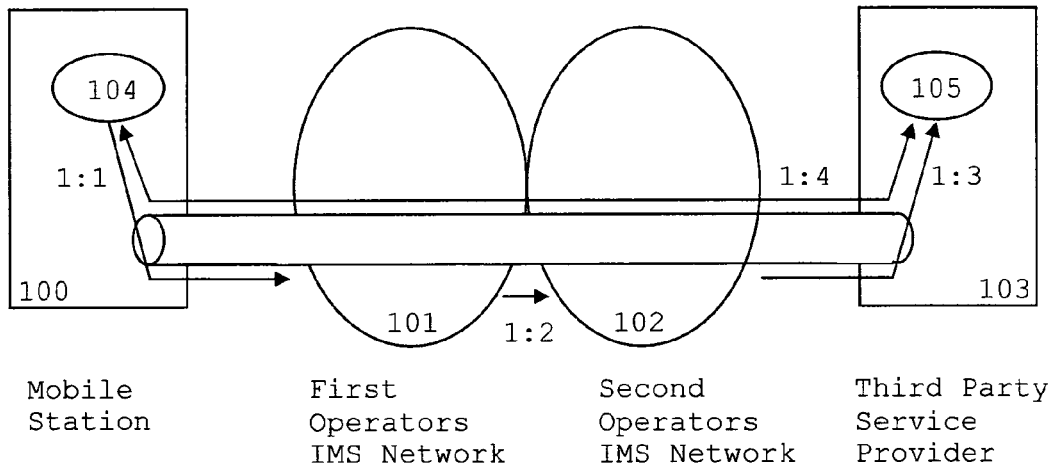
FIG. 1 is a basic overview of the architecture illustrating an exemplified signalling for allowing a user of a mobile station access to a service provided from a third party service provider, according to the prior art.
Figure 2:
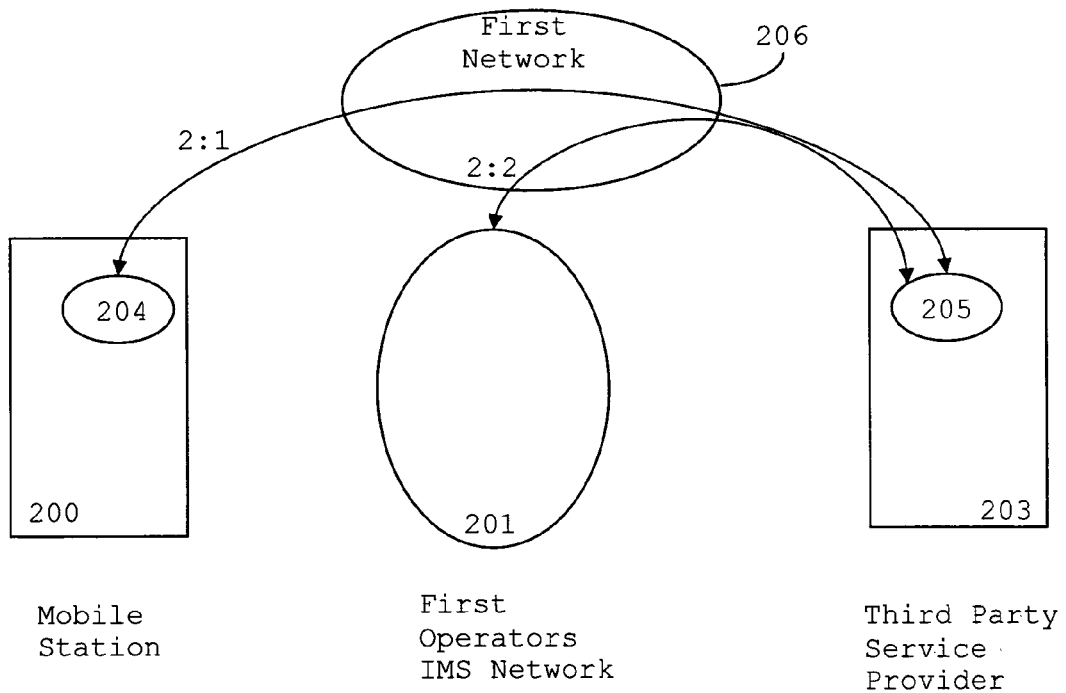
FIG. 2 is a basic overview of the architecture illustrating an exemplified signalling for allowing a third party service provider providing services via a first network, to enhance its service offering by accessing a supplementary network-service provided from another network, according to the prior art.
Figure 3:
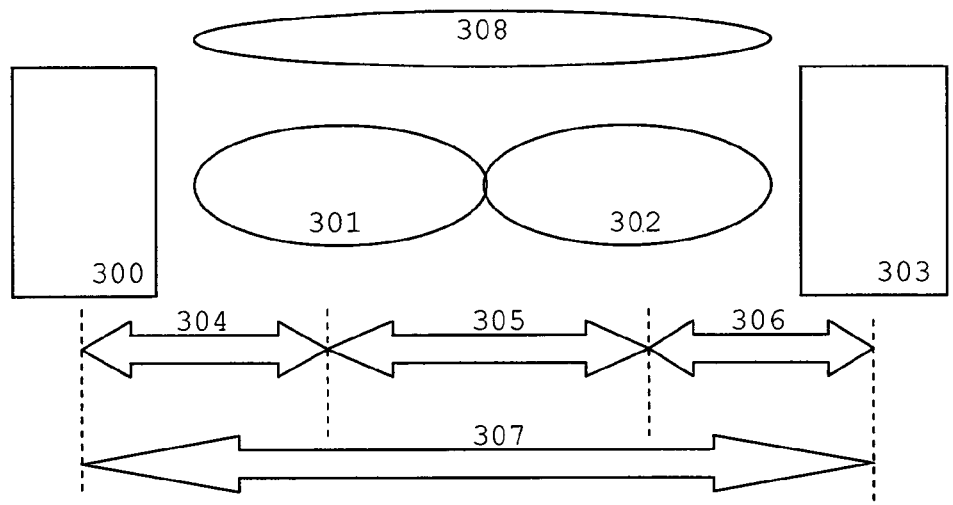
FIG. 3 is a schematic scheme illustrating possible business agreements between the parties earlier mentioned with reference to FIG. 1, as well as between the parties figuring in the claimed invention.

Briefly described, the present invention provides a solution for a third party service provider to gain access to one or more network-services, provided by an IMS network managed of a first operator, wherein the third party service provider has no prior business relation with the first operator, i.e., no business agreement has been set-up between the two parties. This is achieved by way of introducing an address attachment mechanism, adapted to attach a network-service address, necessary for accessing one or more required network-services, to a SIP message delivered between the third party service provider and the IMS network via a SIP session.

According to a first embodiment, described with reference to FIG. 4, a user of a mobile station 400 is a subscriber of an IMS network 401, of a first operator. Throughout this document, this network will be defined as IMS network A. The user of the mobile station 400 may wish to use a service provided from a third party service provider 403, which is connected with, and has a business relation with an IMS network 402 of a second operator. This IMS network will be defined as IMS network B throughout this document.

Via a first application 404, already stored in, or downloaded to the mobile station 400, the user of the mobile station 400 establishes a communication with a second application 405 of the third party service provider 403, via a first network 406, such as, e.g. the Internet, in a first step 4:1. This first step may be decided upon automatically by the first application 404, or in response to an interaction made by the user.

To enable the third party service provider 403 to provide an enhanced service program to the user of mobile station 400, it may require access to one or more network-services, such as, e.g., user statistics, location information or information, related to the quality of service (QoS), provided from IMS network A 401. In this example, an IMS interconnection agreement has already been established between IMS network A 401 and IMS network B 402, prior to the present interaction. Alternatively, an interconnection agreement has already been established between IMS network A 401 and IMS network B 402 via a transit network (not shown), as mentioned previously.

No a-priori interconnection agreement has, however, been established between IMS network A 401, serving the user of mobile station 400, and the third party service provider 403, served by IMS network B 402. At this stage, IMS in itself is obviously not suited to carry all network-services desired by the third party service provider 403 and provided by IMS network A 401. Instead, the third party service provider 403 may access the required one or more network-services via the first network 406, via an existing network-service enabler interface, such as, e.g. a standard or non-standard SOAP/XML interface. In order to do so, however, the network-service address of the respective one or more network-services has to be provided to the third party service provider 403. For this reason, a mechanism adapted to forward the network-service address to the second application 405 of the third party service provider 403, is suggested. With this address, the application 405, will be able to access one or more required network-services from IMS network A 401, via the first network 106, although no a-priori business agreement is set-up between IMS network A 401 and the third party service provider 403.

One way of providing access to the network-services of IMS network A 401 is based on the establishing of a mobile originated IMS-session between the mobile station 400 and the third party service provider 403, involving the two mentioned IMS networks.

The application 404 may be configured to initiate the proposed address attachment mechanism in response to some trigger, e.g. upon having recognised a demand from application 405 for a network-service, available from IMS network A

401. Typically, however, the network-service address is provided to the application via an IMS-session, which is set-up for another reason than explicitly for retrieving the network-service address, and, thus the proposed address attachment mechanism is making use of a SIP-session which would have been set up anyway.

In a second step 4:2, a SIP message, e.g. a "SIP INVITE" or a "SIP MESSAGE", is therefore forwarded to a node, typically a session managing node (not shown), of IMS network A 401, participating in the setting up of the IMS-session. A proposed general architecture including a modified node, comprising means for introducing such a an address attachment mechanism will be described in detail further below, with reference to FIG. 6.

In a next step 4:3, the mobile originated SIP message is inserted into the received SIP message. According to a first, alternative embodiment, the mobile originated SIP message will always be provided with a network-service address, enabling an activated application 405 of the third party service provider 403 access to network-services of IMS network A 401.

Alternatively, the proposed network-service address attachment procedure is conditional, wherein an arriving SIP message is interrogated, and the parties participating in the IMS-session are verified against one or more black lists in order to determine if a network-service address is to be attached or not. By introducing one or more black lists, IMS operator A 401 will be able to deny some parties access to its network-services. The use of black lists will be described in more detail further below, with reference to FIG. 6.

In a next step 4:4, the SIP message, and, optionally also a session identifier, which may have been inserted together with the network-service address, is forwarded from IMS-network A 401 to IMS network B 402, optionally, via an intermediate transit network, and in another step 4:5, the SIP message is forwarded from IMS network B 402 to the third party service provider 403, where the content of the SIP message, including the network-service address, and, optionally, also the session identifier, is forwarded to the second application 405.

In a next step 4:6, application 405 determines whether it is in need of network-services provided from IMS network A 401 for executing a requested service. If required, the network-service address will be used to access the required network-service, by setting up a connection between the third party service provider 403 and IMS network A 401, via the first network 406, as illustrated with a final step 4:7. The two-way communication between the third party service provider 403 and the IMS network A 401 may be based on, e.g. SOAP/XML web services, or any other protocol, suitable for establishing a dynamic business-2-business relation. Via the network-service address, application 405, may request for a network-service immediately, or after having fetched a list, linking each available network-services to a respective address.

If a session identifier was included in the SIP message of step 4:3, this session identifier may be used by the application 405, e.g. for charging purposes, when it is included in the signalling, illustrated with step 4:7, together with the retrieved network-service address.

In response to a request for a network-service, sent in the two-way signalling of step 4:7, an application server (not shown) from which the requested network-services are accessible, provides the application 405 with the relevant data or linking information according to the network-address configuration set in IMS network A 401, and the application 405 may use this data or linking information to execute the requested service accordingly.

When establishing such a dynamic business relation, the IMS operator of IMS network A 401 can authorise what network-services the third party service provider 403, as well as other alternative service providers, are allowed to use. The IMS operator of IMS network A 401 may also specify conditions for use of the network-services, such as, e.g. whether these network-services are to be free of charge, or to be charged for, according to any predefined charging model. For this purpose, the session identifier may be correlated with the respective IMS session set-up by the IMS operator of IMS network A 401. In this way, a required policy may be used for all network-services offered from IMS network A 401. Such a policy could, e.g., specify that some network-services are provided to any IMS session being set-up, whereby these network-services are charged for on an IMS layer basis, rather than on a per network-service.

In another embodiment, which will now be described with reference to FIG. 5, a mobile terminated IMS-session, to be used for the delivery of a network-service address, is initiated from the third party service provider 403. Also in this embodiment, a user of a first mobile station 400, is a subscriber of an IMS operator of a first IMS network, denoted IMS network A 401. The IMS operator of IMS network A 401 has an interconnection agreement with another operator of a second IMS network, denoted IMS network B 402, which has a business agreement with the third party service provider 403.

In a first step 5:1, an application 404 in the mobile terminal 400, initiates a communication with an application 405 of the third party service provider 403, via a first network 406, e.g. in response to a user interaction. In this step, the IMS address, e.g. an IMS public user identity, of the mobile station, and, optionally, also a sub-address, e.g. an IMS communication services identifier (ICSI) of application 404, is forwarded to application 405. In resemblance to the first embodiment, this communication gives the user access to services provided from the third party service provider 403. Application 404 may have been downloaded by application 405, or, if already present in the mobile station 400, it may have been activated from application 405 or in response to a user interaction.

Based on the retrieved information, application 405 may initiate an IMS session to the terminal address of the mobile station 400, and, optionally, to the sub-address of application 404. Alternatively, application 405 may recognise that a network-service, available at IMS network A 401, is required, whereby an establishment of a mobile terminated session is set-up between the third party service provider 403 and the mobile station 400.

In a mobile terminated session set-up according to this second embodiment, a SIP message is sent from the third party service provider 403, to IMS network B 402 in a step 5:2, and the SIP message is forwarded from IMS network B 402 to IMS network A 401 in a next step 5:3. Alternatively, the interconnection between IMS network B 402 and IMS network A 401 is executed via a transit network. The SIP message is then sent from the IMS network A 401 to the mobile station 400 in step 5:4, where the content of the SIP message is forwarded to application 404 of the mobile station 400. Application 404 responds by initiating a SIP response message, e.g. SIP 200 OK, which is forwarded to IMS network A 401 in step 5:5.

In a next step 5:6, the network-service address is added to the SIP response message in the same way as described in association with the first embodiment, described above.

If applicable, a session identifier may also be added to the SIP response message at this stage. In a next step 5:7, the SIP response message is forwarded to IMS network B 402, and in a step 5:8, it is forwarded to the third party service provider 403, where the content of the SIP response message, is delivered to application 405. The application 405 can now retrieve the network-service address, and, if inserted together with the network-service address, also the session identifier in a step 5:9. In a next and final step 5:10, application 405 will be able to establish contact with IMS network A 401, via the first network 406, in order to access a network-service.

Figure 4:
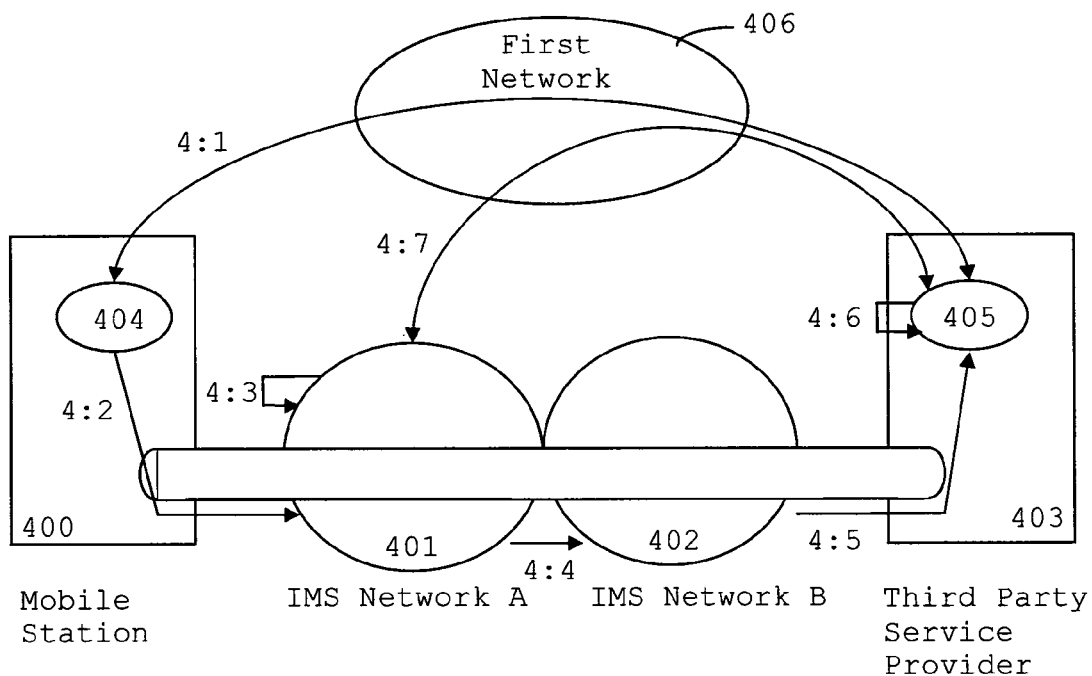
FIG. 4 is a basic overview illustrating an architecture and signalling for providing a network-services address to a third party service provider via a mobile originated IMS-session, according to a first embodiment.
Figure 5:
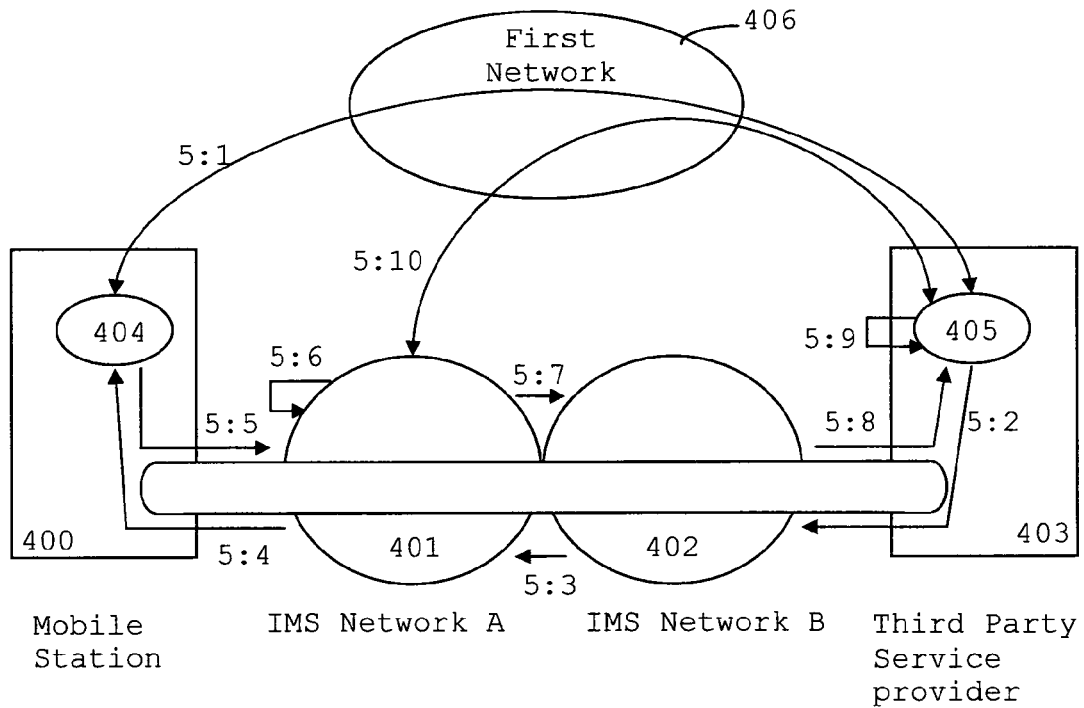
FIG. 5 is a basic overview illustrating an architecture and signalling for providing a network-services address to a third party service provider via a mobile terminated IMS-session, according to another embodiment.
Figure 6:
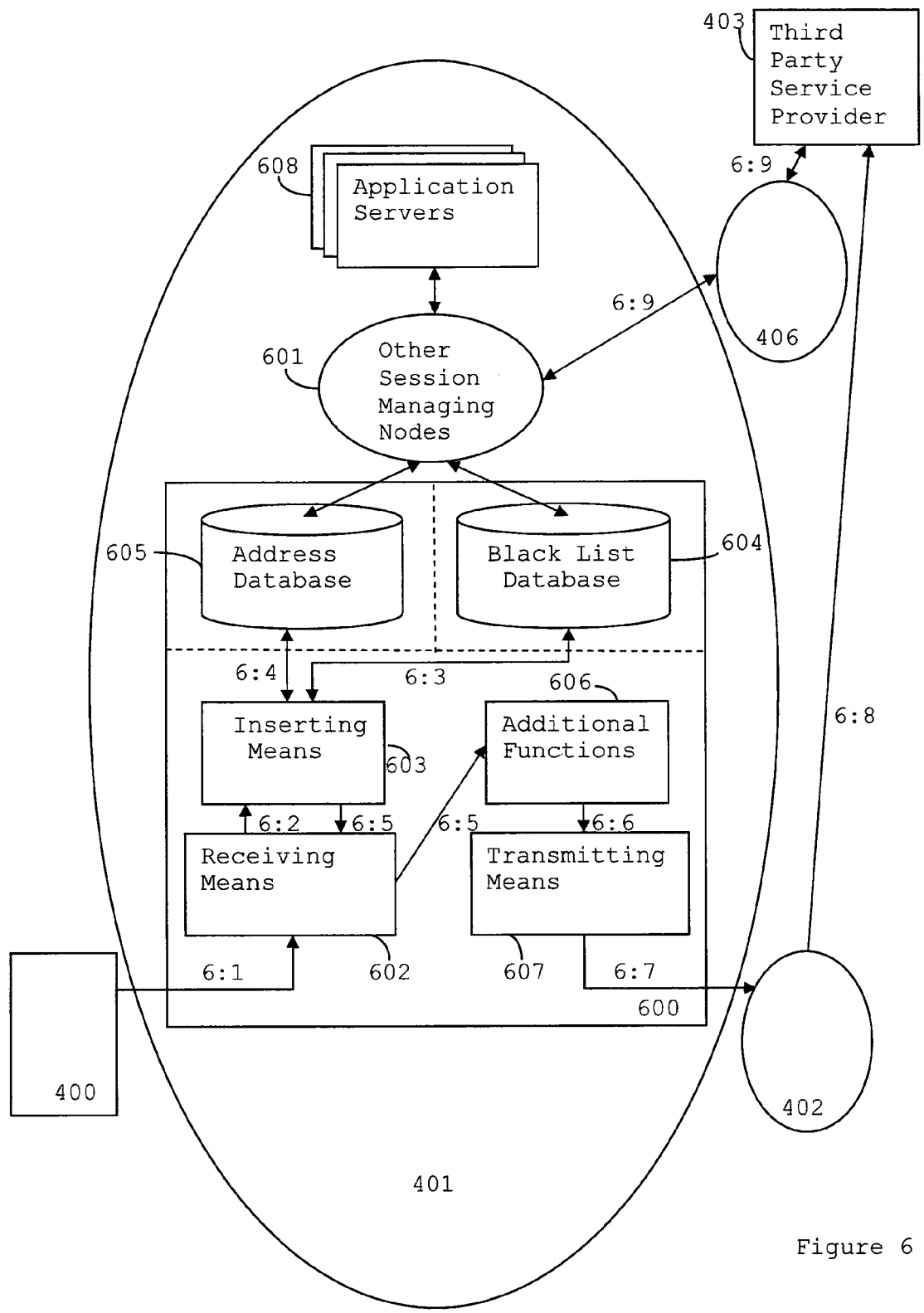
FIG. 6 is a schematic architecture of an IMS network comprising a session managing node adapted to provide a network-services address to a third party service provider.

FIG. 6 is a schematic architecture of IMS network A 401, previously presented with reference to FIGS. 4 and 5. A modified node 600, adapted to attach a network-service address to a SIP message, is connected to a plurality of additional session managing nodes 601, adapted to manage SIP-sessions between IMS network A 401 and external nodes and entities. The node 600, is typically a session managing node which is provided with the functionality necessary for managing the proposed network-service address attachment procedure, in addition to the conventional SIP session managing functionality which the node is set to manage.

Node 600 comprises a receiving means 602 adapted to receive SIP messages, which, according to the presented embodiments, arrive from the mobile station 400, as described in the two embodiments presented above.

At the receiving means 602, SIP messages are received from a mobile station 400 in a first step 6:1. The received SIP message, which may be a SIP message of a mobile originated SIP-session, such as, e.g. a SIP INVITE, or a SIP response, responding to a mobile terminated SIP-session, are forwarded to an inserting means 603 in a step 6:2. The inserting means 603 may be adapted to insert a network-service address unconditionally. Alternatively, the inserting means 603 interrogates a black list database 604 in a step 6:3 to determine whether, e.g. the originating and/or terminating party of the IMS-session is/are registered in a black list. A SIP message comprising a black listed party will be forwarded unchanged from the receiving means 602, i.e. with no network-service address added. If, however, no blacklisted participants can be identified in the SIP message, a network-service address is added to the SIP message in a step 6:4.

In one embodiment, the respective network-address is attached to a new SIP header of a received SIP message, which may be established, e.g., according to the following structure:
originating-network-services-
address=services@operatorA.com wherein "originating-network-services-address" indicates, e.g. that the SIP header comprises a network-address of network-services provided from IMS network A 401.

The network-service address to be attached may be any of a number of alternative network-service addresses, wherein the respective network-service address to be inserted is specified according to the present configuration of the node 600.

In one embodiment, the network-service address may be the address of a catalogue of network-services, provided by IMS network A 401, wherein the catalogue can reached, e.g., via a Universal Description, Discovery and Integration (UDDI) service. A UDDI service is accessed via a URL address, addressing a UDDI server. By interrogating such a catalogue, an application may be able to find out which services that are available at IMS network A 401, and how to access them, wherein the catalogue is provided with, e.g. one URL per service.

In an alternative embodiment, the network-service address to be inserted may instead be configured to be the address of a specific network-service, e.g., a network-service providing location information. In such an implementation, the name of the new SIP header field should preferably indicate this address type, e.g. as: "originating-network-service-address-locationservices".

In yet another alternative embodiment, the network-address could be an address to a specific structure, e.g. an XML document, comprising a description of network-services, and a listing of all network service enabler addresses via which network-services are accessible from IMS network A 401.

As mentioned previously, the inserting means 603 may also be adapted to insert a session identifier into the SIP message. With a session identifier added, it will be possible to identify the respective IMS-session, the originating, and/or the terminating party in the IMS-session, at a later stage of the ongoing communication. Such an identification may be useful for, e.g. charging purposes, or to hold a party responsible for abuse when accessing the network.

An alternative to using a session identifier, could be to add the IMS public identity of the user in a service request sent by the third party service provider 403, in step 4:7 of FIG. 4, or in step 5:8 of FIG. 5, respectively.

Once a mobile station originated SIP message has been handled in the inserting means 603, it is forwarded to any additional functions of node 600 in a step 6:5, to be processed accordingly. These functions are represented by 606 in the figure. The SIP message is then transmitted to a conventional transmitting means 607 in a step 6:6, from where it is delivered towards IMS network B 402 in a next step 6:7, and to the third party service provider 403 in a step 6:8.

At the third party service provider 403, the content of the SIP message is forwarded to the respective application, and if one or more network-services are required by the application, the respective one or more network-services are accessed via network 406 in step 6:9, using the network-service address, retrieved via the SIP message.

IMS network A 401 also comprises a plurality of Application Servers 608, providing one or more network-services via a network service enabler interface, wherein the one or more network-services are accessed by using the network-service address.

Both the address database 605, and the black list database 604 are in connection with the application servers 608 of IMS network A 401, in order to be continuously updated. Such an updating procedure may be implemented according to any conventional updating mechanism. This procedure will not be described in any further detail in this document.

Figure 7:
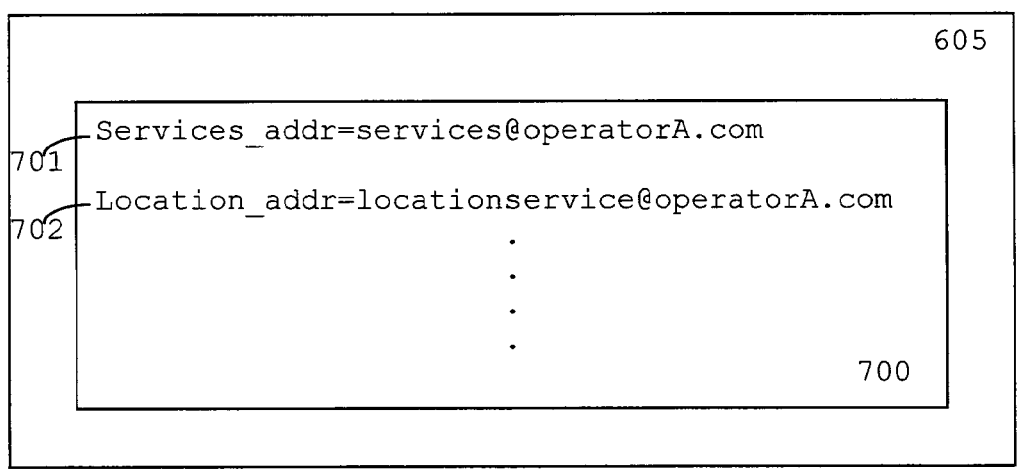
FIG. 7 is an exemplary structure of the address database, previously described with reference to FIG. 6.

An exemplary structure of an address list 700 of the address database 700 presented with reference to FIG. 6 is illustrated in FIG. 7. The address list 700 comprises a first network-service address 701, which may be, e.g. an address to a service catalogue of operator A, as describe previously, and a second address 702, which is, e.g. the address of a location service provided by IMS operator A. Although the address database 605 may store different network-service addresses associated with network A, the node 600 is set to only insert one specified network-service-address, wherein the address is determined according to the configuration of the node.

Figure 8:
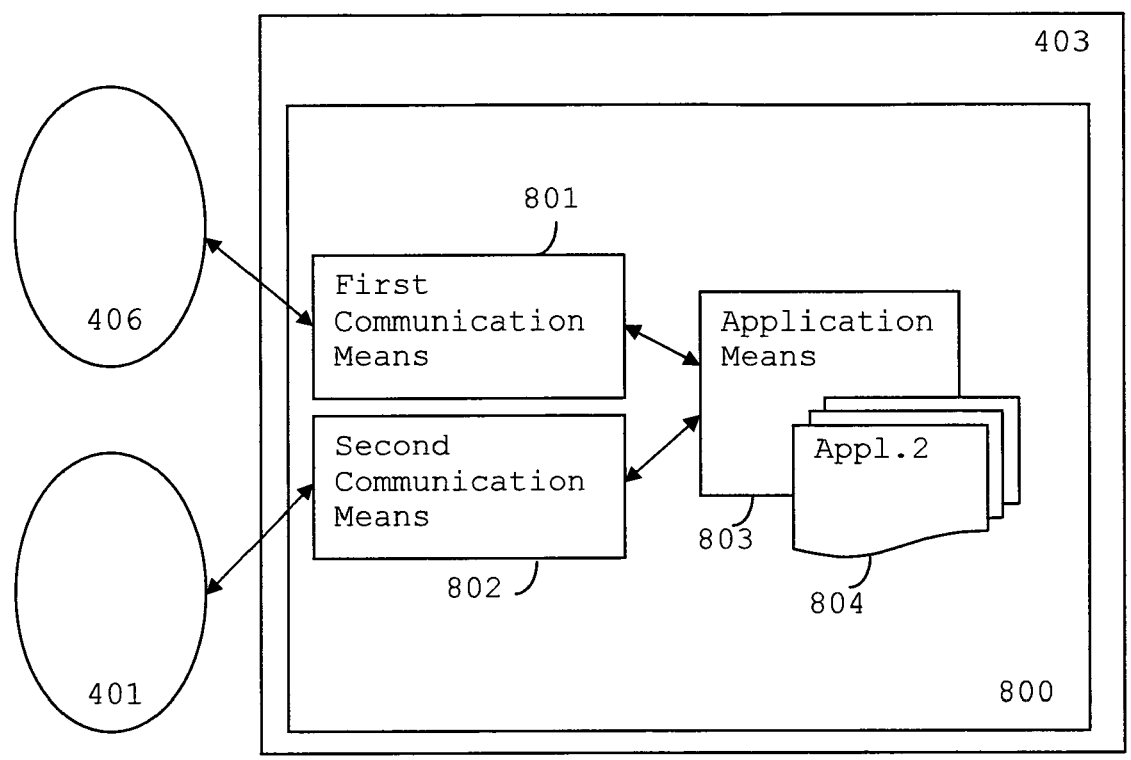
FIG. 8 is a schematic architecture of a third party service provider operating in accordance with the described embodiments of the claimed invention.

An exemplary third party application server 800 of a third party service provider 403, adapted to operate in accordance with any of the described embodiments, will now be described with reference to the simplified block diagram of FIG. 8. A first communication means 801, is adapted to set-up a connection with a mobile station (not shown), via a first network 406, while a second communication means 802 is adapted to set up an IMS-session with the mobile station via IMS network A 401 (via another IMS network 402), as described previously. An application means 803 comprises logic, adapted to manage execution of an application 804, which may have been activated, e.g. from a mobile station, via network 406, as described previously. The application means 803 comprises instructions to set up an IMS-session via IMS network A 401, in order to retrieve a network-service address, as described previously. Alternatively, an associated application, located in the mobile station activates an IMS-session between the mobile station served by the third party service provider 403, and the third party service provider 800.

Upon determining that one or more network-services are required, the application means 803 sets up a connection with the IMS network A 401, using the network-service address to retrieve the respective one or more network-services from IMS network A 401.

While the invention has been described with reference to specific exemplary embodiments, the description is generally only intended to illustrate the inventive concept and should not be taken as limiting the scope of the invention, which is defined by the appended claims.

The invention claimed is:

1. A method of a third party service provider for retrieving a network-service address of at least one network-service offered by an Internet Protocol Multimedia Subsystem (IMS) network of a first IMS operator, wherein the third party service provider has no business agreement with the first IMS operator but does have a business agreement with a second IMS operator providing a second IMS network, the method comprising:
   activating an application of the third party service provider from a mobile station via a first network;
   establishing an IMS-session between the third party service provider and the mobile station via the first IMS network, and via the second IMS network;
   retrieving the network-service address of the at least one network-service at the application of the third party service provider, wherein the network-service address has been inserted into a mobile originated SIP message of the IMS-session at a session managing node of the first IMS network;
   determining by the application of the third party service provider whether the application requires a network-service provided by the IMS network of the first operator; and
   accessing a required network-service from an application server of the IMS network of the first operator via the first network using the retrieved network-service address.

2. The method of claim 1, wherein the first network is the Internet.

3. The method of claim 1, wherein the first IMS operator has a business agreement with the second IMS operator.

4. The method of claim 1, wherein the two IMS networks are interconnected via a transit network.

5. The method of claim 1, wherein the network-service address is inserted into a new network-services address header of the SIP message.

6. The method of claim 1, wherein the one or more network-services are accessed via a network service enabler interface using the inserted network-service address.

7. The method of claim 6, wherein the network-service address is an address to any of: a catalogue of network-services or a specific network-service.

8. The method of claim 7, wherein the catalogue also comprises an identifier for each network-service specifying what protocol to use to access the respective network-service.

9. The method of claim 6, wherein the network-service address is an address to a structure comprising at least one network service enabler address.

10. The method of claim 9, wherein the structure also comprises an identifier for each network-service specifying what protocol to use to access the respective network-service.

11. The method of claim 1, wherein a session identifier also is inserted into the SIP message.

12. The method of claim 1, wherein the IMS-session is mobile station originated and the network-service address is inserted into a SIP INVITE.

13. The method of claim 1, wherein the IMS-session is mobile station terminated and the network-service address is inserted into a SIP RESPONSE.

14. A method of an Internet Protocol Multimedia Subsystem (IMS) network node for providing a network-service address of at least one network-service provided by a first IMS network of a first operator to a third party service provider, wherein the third party service provider has no business agreement with the first operator but does have a business agreement with a second operator providing a second IMS network, the method comprising:
   receiving a mobile station originated SIP message of an IMS-session established between the third party service provider and a mobile station accessing a network-service of the third party service provider via a first network;
   interrogating the received SIP message for determining whether a terminating and/or originating party of the IMS-session is registered in a black list;
   if the terminating and/or originating party of the IMS-session is registered in a black list, determining that no network-service address is to be inserted into the SIP-message; and
   if neither the terminating nor the originating party of the IMS-session are registered in a black list, performing the following:
   inserting a network-service address into the SIP message; and
   forwarding, via the second IMS network, the SIP message to the third party service provider.

15. A session managing node adapted to provide a network-service address of at least one network-service of a first Internet Protocol Multimedia Subsystem (IMS) network of a first operator to a third party service provider, wherein the third party service provider has no business agreement with the first operator but does have a business agreement with a second operator providing a second IMS network, the session managing node comprising:
   a network interface for receiving a mobile station originated SIP message of an IMS-session established between the third party service provider and a mobile station accessing a network-service of the third party service provider via a first network;
   a processor for inserting a network-service address into the SIP message upon having interrogated the SIP message and upon having determined that a network-service address is to be inserted into the SIP message; and
   a network interface for transmitting the SIP message to the third party service provider via the second IMS network;
   wherein the processor is adapted to determine that no network-service address is to be inserted into a SIP message if a terminating and/or originating party of the IMS-session is found in a black list.

16. The session managing node of claim 15, wherein the network-service address is provided from an address database, which is continuously updated by at least one application server providing network services.

17. The session managing node of claim 15, wherein the processor is further adapted to insert a session identifier into the SIP message.

18. The session managing node of claim 15, wherein the first operator has a business agreement with the second operator.

19. An arrangement for a telecommunication system that comprises a first network, a first Internet Protocol Multimedia Subsystem (IMS) network of a first operator serving a mobile station, and a second IMS network of a second operator, wherein the third party service provider has no business relation with the first IMS network of the first operator, but does have a business agreement with a second operator providing a second IMS network, the arrangement comprising:

one or more nodes at the third party service provider configured for establishing a communication between a first application of the mobile station and a second application of the third party via the first network, and for setting up an IMS session between the mobile station and the third party service provider; and a session managing node configured for inserting a network-service address of at least one network-service provided by the first IMS network;

wherein said one or more nodes at the third party service provider are further configured for receiving the network-service address and for forwarding it to the second application via the second IMS network; and wherein said one or more nodes at the third party service provider are further configured to:

determine whether the second application requires at least one network-service provided from the IMS network of the first operator;

set up a connection with an application server of the IMS network of the first operator via the first network if the second application requires at least one network-service from the IMS network of the first operator using the retrieved network-service address.

* * * * *